US008065323B2

(12) United States Patent
Sallakonda et al.

(10) Patent No.: US 8,065,323 B2
(45) Date of Patent: Nov. 22, 2011

(54) OFFLINE VALIDATION OF DATA IN A DATABASE SYSTEM FOR FOREIGN KEY CONSTRAINTS

(75) Inventors: Satish Kumar Sallakonda, Dublin, CA (US); Mary E. G Bear, Burlingame, CA (US); Selvaganapathy Ayyamperumal, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 268 days.

(21) Appl. No.: 12/391,246

(22) Filed: Feb. 23, 2009

(65) Prior Publication Data

US 2010/0228764 A1 Sep. 9, 2010

(51) Int. Cl.
*G06F 7/00* (2006.01)
*G06F 17/30* (2006.01)

(52) U.S. Cl. ............... 707/769; 707/770; 707/E17.014; 707/E17.045

(58) Field of Classification Search ............ 707/769, 707/705, E17.005, E17.009, E17.014, E17.044, 707/E17.045, 770
See application file for complete search history.

(56) References Cited

U.S. PATENT DOCUMENTS

| | | | | | |
|---|---|---|---|---|---|
| 4,947,320 | A | * | 8/1990 | Crus et al. | 707/999.201 |
| 5,956,725 | A | * | 9/1999 | Burroughs et al. | 707/999.101 |
| 6,151,608 | A | * | 11/2000 | Abrams | 707/756 |
| 6,560,598 | B2 | | 5/2003 | Delo et al. | |
| 6,795,821 | B2 | * | 9/2004 | Yu | 707/999.01 |
| 7,136,868 | B2 | * | 11/2006 | Sonkin et al. | 707/754 |
| 7,401,094 | B1 | * | 7/2008 | Kesler | 707/805 |
| 2002/0059187 | A1 | * | 5/2002 | Delo et al. | 707/1 |
| 2004/0093559 | A1 | | 5/2004 | Amaru et al. | |
| 2004/0153435 | A1 | * | 8/2004 | Gudbjartsson et al. | 707/1 |
| 2005/0283501 | A1 | * | 12/2005 | Blaicher et al. | 707/200 |
| 2006/0224637 | A1 | * | 10/2006 | Wald | 707/200 |
| 2007/0038618 | A1 | * | 2/2007 | Kosciusko et al. | 707/4 |
| 2007/0174234 | A1 | | 7/2007 | Ramsey | |
| 2007/0208787 | A1 | * | 9/2007 | Cheng et al. | 707/204 |
| 2007/0226196 | A1 | * | 9/2007 | Adya et al. | 707/3 |
| 2008/0183766 | A1 | * | 7/2008 | Weston et al. | 707/200 |
| 2009/0024652 | A1 | * | 1/2009 | Thompson et al. | 707/102 |
| 2009/0024677 | A1 | * | 1/2009 | Cheng et al. | 707/204 |
| 2009/0292711 | A1 | * | 11/2009 | Konik et al. | 707/100 |

OTHER PUBLICATIONS

D. Gomik—"UML Data Modeling Profile"—Relational Corporation IBM—TP162, May 2002 (pp. 1-13).*
Sun Microsystems—Sun GlassFish Enterprise Server—SGFE server 2.1 Developer's Guide—Jan. 2009 (pp. 1-318).*
"Lihua Ran et al.,", "AUTODBT: A Framework for Automatic Testing of Web Database Applications", "http://cat.inist.fr/?aModele=afficheN&cpsidt=16368005", Dated: Nov. 22, 2004, p. 1, vol. 3306.

(Continued)

*Primary Examiner* — John E Breene
*Assistant Examiner* — Anh Ly
(74) *Attorney, Agent, or Firm* — Narendra Reddy Thappeta

(57) ABSTRACT

An aspect of the present invention performs offline validation of data in database system for foreign key constraints. In an embodiment, a foreign key constraint defined for a database system is identified and an SQL script designed to verify whether data values stored in a foreign key column of a detail table is present in a primary key column of a master table (corresponding to the identified foreign key constraint), is generated. The SQL script is executed to determine whether the data stored in the database system satisfies the identified foreign key constraint.

18 Claims, 8 Drawing Sheets

OTHER PUBLICATIONS

"DTM Data Generator—Realistic Data for Database Testing Purposes", "http://www.sqledit.com/dg/", Copyright Date: 2004-2008, p. 1.

"Michael Kelly et al.,", "Effective Database Testing With IBM Rational Functional Tester 6.1", "http://www.ibm.com/developerworks/rational/library/05/0906_kelly/index.html", Updated Date: Nov. 10, 2005, pp. 1-12.

"LDC's Automated Data Validation (ADV)", "http://www.lab-data.com/adv.htm", Downloaded Circa: Nov. 11, 2008, p. 1.

"Migrating ZIM Applications to Oracle and Other SQL DBMS", "http://www.bakersoftwaretechnologies.com/torch.pps", Downloaded Circa: Nov. 11, 2008, pp. 1-49.

"Softinabox Script Engine 0.3.0 Build 52 (Beta 3)", "http://www.softpedia.com/get/Internet/Servers/Database-Utils/Softinabox-Script-Engine.shtml", Last Updated Date: Oct. 28, 2005, pp. 1-2.

"Validating a Database", "http://opensitesearch.sourceforge.net/docs/helpzone/dbb/dbb_50-20-90t.html", Downloaded Circa: Nov. 11, 2008, pp. 1-2.

* cited by examiner

```
400: <composite version="1.0" xmlns="http://xmlns.oracle.com/ku">
400A: <base_object>
401:   <table>
402:     <schema>fusion</schema>
403:     <name>hrt_content_grp_types_b</name>
404:     <relational_table>
405:       <col_list>
406:         <col_list_item>
407:           <name>content_group_type_id</name>
408:           <datatype>number</datatype>
409:           <precision>15</precision>
410:           <scale>0</scale>
411:           <not_null/>
412:         </col_list_item>
413:         ......
414:         <col_list>
415:     <primary_key_constraint_list_item>
416:       <name>hrt_content_grp_types_b_pk</name>
417:       <col_list>
418:         <col_list_item>
419:           <name>content_group_type_id</name>
420:         </col_list_item>
421:       </col_list>
422:       <disable/>
423:     </primary_key_constraint_list_item>
424:     ......
425:   <relational_table>
426:   </table>
427: </base_object>
428: ......
429: </composite>
```

*FIG. 4A*

```
430: <composite version="1.0" xmlns="http://xmlns.oracle.com/ku">
430A:   <base_object>
431:      <table>
432:         <schema>fusion</schema>
433:         <name>hrt_content_groups_b</name>
434:         <relational_table>
435:            <col_list>
436:               <col_list_item>
437:                  <name>content_group_id</name>
438:                  <datatype>number</datatype>
439:                  <precision>15</precision>
440:                  <scale>0</scale>
441:                  <not_null/>
442:               </col_list_item>
443:               <col_list_item>
444:                  <name>content_group_type_id</name>
445:                  <datatype>number</datatype>
446:                  <precision>15</precision>
447:                  <scale>0</scale>
448:                  <not_null/>
449:               </col_list_item>
450:               ...
451:            </col_list>
452:            <primary_key_constraint_list_item>
453:               <name>hrt_content_groups_b_pk</name>
454:               <col_list>
455:                  <col_list_item>
456:                     <name>content_group_id</name>
457:                  </col_list_item>
458:               </col_list>
459:            </primary_key_constraint_list_item>
```

*FIG. 4B*

```
460:    ....
461:    <foreign_key_constraint_list>
462:        <foreign_key_constraint_list_item>
463:            <name>hrt_content_groups_b_fk1</name>
464:            <col_list>
465:                <col_list_item>
466:                    <name>content_group_type_id</name>
467:                </col_list_item>
468:            </col_list>
469:            <references>
470:                <schema>fusion</schema>
471:                <name>hrt_content_grp_types_b</name>
472:                <col_list>
473:                    <col_list_item>
474:                        <name>content_group_type_id</name>
475:                    </col_list_item>
476:                </col_list>
477:            </references>
478:        </foreign_key_constraint_list_item>
479:    </foreign_key_constraint_list>
480:    ....
481:    </relational_table>
482: </table>
483: </base_object>
484: ................
485: </composite>
```

*FIG. 4C*

495: hrt_content_groups_b.content_group_type_id=hrt_content_grp_types_b.content_group_type_id
496: hrt_content_items_b.content_type_id=hrt_content_types_b.content_type_id

*FIG. 4D*

```
500: /** Generating Foreign Key Validations**/
501: select distinct
502:    'table name: hrt_content_groups_b' || ',
503:    content_group_id:' ||content_group_id ||',
504:    column: content_group_type_id, value:'|| content_group_type_id
505: from hrt_content_groups_b
506: where hrt_content_groups_b.content_group_type_id
507:    not in
508:        (select hrt_content_grp_types_b.content_group_type_id
509:         from hrt_content_grp_types_b)
510:    and hrt_content_groups_b.content_group_type_id is not null ;
511: select distinct
512:    'table name: hrt_content_items_b' || ',
513:    content_item_id:' ||content_item_id ||',
514:    column: content_type_id, value:'|| content_type_id
515: from hrt_content_items_b
516: where hrt_content_items_b.content_type_id
517:    not in
518:        (select hrt_content_types_b.content_type_id
519:         from hrt_content_types_b)
520:    and hrt_content_items_b.content_type_id is not null ;
521: /**Done - Generating Foreign Key Validations **/
```

*FIG. 5A*

```
550:/**Generating Foreign Key Validations **/
551: table name: hrt_content_groups_b, content_group_id:205, column: content_group_type_id, value: 104
552: table name: hrt_content_groups_b, content_group_id:209, column: content_group_type_id, value: 104
553: table name: hrt_content_groups_b, content_group_id:204, column: content_group_type_id, value: 104
554: table name: hrt_content_groups_b, content_group_id:207, column: content_group_type_id, value: 104
555: /**Done - Generating Foreign Key Validations **/
```

*FIG. 5B*

OFFLINE VALIDATION OF DATA IN A DATABASE SYSTEM FOR FOREIGN KEY CONSTRAINTS

BACKGROUND

1. Technical Field

The present disclosure relates to database systems and more specifically to offline validation of data in a database system for foreign key constraints.

2. Related Art

A database system generally enables data to be organized and managed in a structured manner. A common example of a database system is a relational database management system (RDBMS), in which data is organized in the form of one or more databases, tables and columns (containing the actual data values), and the data is managed (added/deleted/updated, etc.) in databases using structured queries (e.g., Structured Query Language) as is well known in the relevant arts.

Keys are fundamental to the organization of data in a database system. Thus, in the context of relational database systems, data is organized in the form of tables and a primary key (spanning one or more columns) uniquely identifies each row of a table. On the other hand, a foreign key identifies a column or a set of columns (foreign key column) in one (referencing) table that refers to a column or set of columns (primary/candidate key column) in another (referenced) table.

Constraints are often defined associated with a database system to restrict the type/format/uniqueness of the data values stored in specific columns in the database system. In particular, with respect to foreign keys noted above, the data values stored in a foreign key column of a table are to be restricted to the specific data values stored in the primary key column in another table. Such a constraint is referred to as a foreign key constraint.

Validation of data for foreign key constraints is commonly performed/enforced when data values are sought to be stored in the database system during normal operations (e.g., when processing transaction requests, etc). Such validations performed during normal operations may be termed as 'online or real-time validation', and generally operates to ensure that the data in the database system is maintained in a consistent form, including enforcement of the foreign key constraints (according to the design/definition of the database system).

There is often a need for offline validation of data for foreign key constraints. Offline validation refers to validation of data already stored in a database system. Offline validation may be desirable, for example, in scenarios where the database system is required to be populated with large amount of data (e.g., when migrating, upgrading or importing) without enforcements of the constraints during the population/storage process (to reduce the time/resources requirements). Accordingly, it may be desirable that the populated data be validated offline/later to ensure that the data is consistent for subsequent normal operation of the database system.

Several aspects of the present invention provide for offline validation of data in a database system for foreign key constraints, as described below with examples.

BRIEF DESCRIPTION OF THE DRAWINGS

Example embodiments of the present invention are described with reference to the accompanying drawings briefly described below.

FIG. 4A-4C depicts portions of definition files specifying the details of structure and constraints defined for a database in one embodiment.

FIG. 4D depicts a portion of a properties file storing the foreign key constraints defined in one embodiment.

FIG. 5A depicts a portion of a SQL script generated to check foreign key constraints in one embodiment.

FIG. 5B depicts a portion of output of execution of a SQL script (shown in FIG. 5A) designed to check foreign key constraints in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention validates foreign key constraints in a database system. In an embodiment, a foreign key constraint defined for a database system is identified and an SQL script designed to verify whether each data values stored in a foreign key column of a detail table is present in a primary key column of a master table (corresponding to the identified foreign key constraint), is generated. The SQL script is executed to determine whether the data stored in the database system satisfies the identified foreign key constraint.

Thus, data populated in a database system without enforcement of constraints, is validated offline to ensure that the data is consistent. Such validation of data may be performed after migration/upgrade/import of data to the database system.

Accordingly to another aspect of the present invention, such a feature is conveniently used by a vendor of an enterprise application to support the application deployed at various customer sites. In such a scenario, when a customer requires validation of foreign key constraints for data stored in a database system located at the customer site, a validation tool deployed at the customer site is designed to send a request to a vendor system, which then generates the SQL script and sends the same to the requesting validation tool. The validation tool executes the SQL script on the database system located at the customer site to verify whether the data satisfies the foreign key constraints. Accordingly, the vendor of the enterprise application is enabled to support multiple customer sites.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

2. Example Environment

Figure 1:
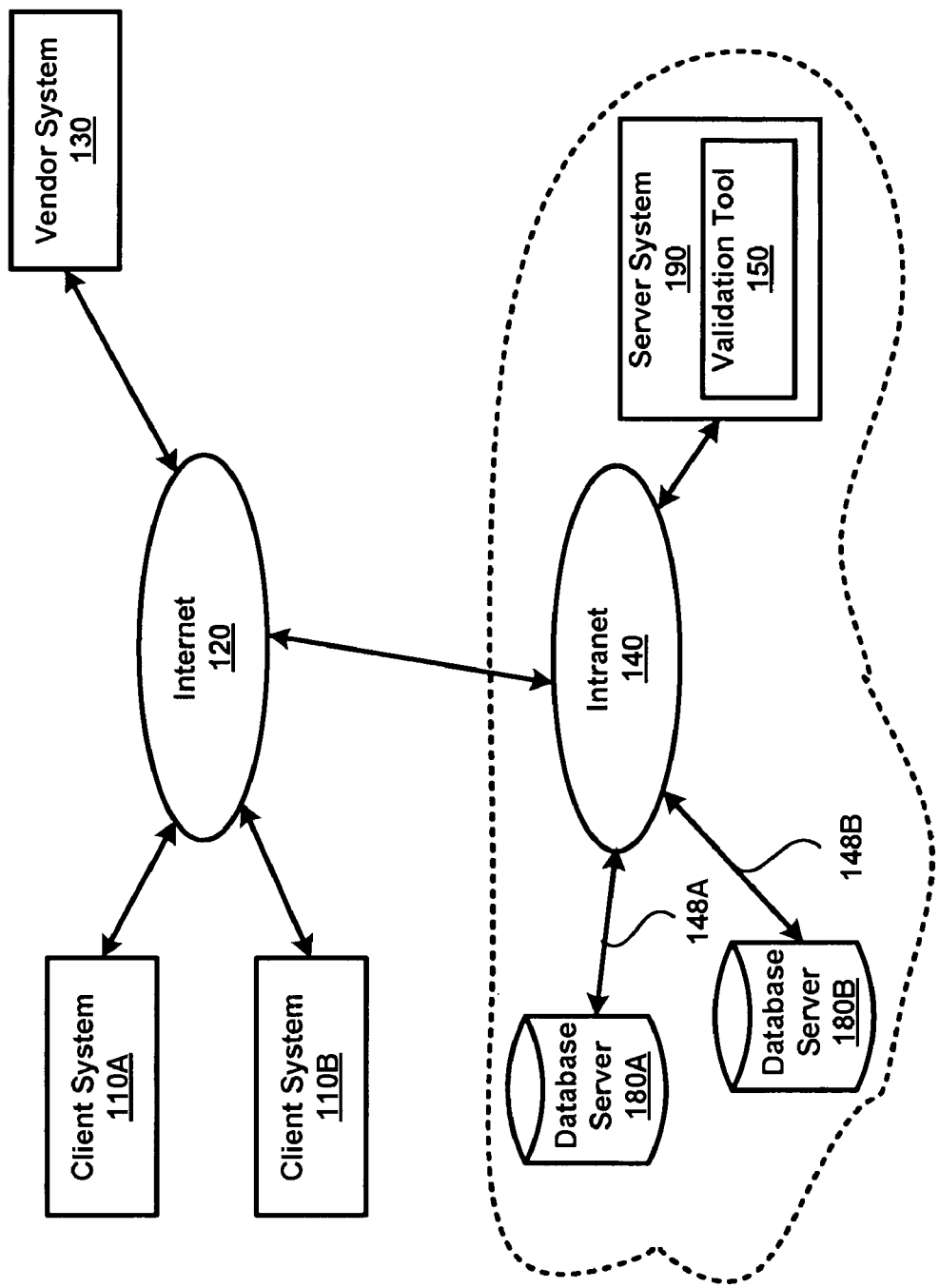
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110B, Internet 120, vendor system 130, intranet 140, database servers/systems 180A-180B and server system 190 (containing validation tool 150).

Merely for illustration, only representative number/type of systems is shown in the Figure. Many environments often contain many more systems, both in number and type, depending on the purpose for which the environment is designed. Each block of FIG. 1 is described below in further detail.

Intranet 140 represents a network providing connectivity between database servers 180A-180B, and server system 190, all provided within an enterprise (shown with dotted boundaries). Internet 120 extends the connectivity of these (and other systems of the enterprise) with external systems such as client systems 110A-110B and vendor system 130.

Each of intranet 140 and internet 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Each of client systems 110A-110B represents a system such as a personal computer, workstation, mobile station, etc., used by users to generate (client) requests to one or more enterprise/business applications executing in server system 140. The requests may be generated using appropriate interfaces. In general, a client system requests an enterprise application for performing desired tasks and receives corresponding responses containing the results of performance of the requested tasks.

Vendor system 130 represents a server system facilitating a vendors/provider of an enterprise application (executing in server system 190 or in the enterprise/customer site in general) to provide maintenance services, such as validating data used by the enterprise application, verifying the functioning of the enterprise application, etc. Vendor system 130 may maintain information, such as the structure of the data, the verification check points, etc., in a data store (not shown) to facilitate provisioning of various maintenance services.

Server system 190 represents a server, such as a web/application server, which executes enterprise applications (provided by vendors) capable of performing tasks requested by users from one of client systems 110A-110B. The enterprise applications may perform the tasks on data maintained internally (in server system 190, not shown) or on external data, for example, maintained in database servers 180A-180B and then send the result of performance of the tasks to the requesting client system. Server system 190 may also contain other software programs such as operating system, device drivers, etc., (not shown) that provides a common runtime environment facilitating the execution of the enterprise applications (as well as validation tool 150).

Each of database servers 180A-180B facilitates storage and retrieval of a collection of data using structured queries. In one embodiment, database servers 180A-180B are implemented using relational database technologies and therefore provides storage and retrieval of data using structured queries such as SQL (Structured Query Language). As is well known in the relevant arts, SQL refers to a special-purpose, nonprocedural language (generally indicates what to retrieve based on conditions, in contrast to how to retrieve) that supports the definition, manipulation, and control of data in relational database systems.

Each of database servers 180A-180B may maintain data used by enterprise applications executing in server system 190, for example, while processing requests received from client systems 110A-110C. Database servers 180A-180B may perform structured queries received from the enterprise applications for storing/retrieving the data (via paths 148A-148B), while enforcing the constraints defined on the data values in each of the database systems.

It may be desirable that data be stored in database server 180A (or 180B, though the description is continued with respect to database server 180A merely for illustration) without enforcing (or having earlier enforced) the constraints. In one scenario, a large amount of data may be sought to be imported from a non-database source (such as a file) into database server 180A in a single transaction. In another scenario, data may be sought to be migrated (that is, moved/copied) from another database server (such as 180B) to database server 180A. In yet another scenario, the data in database server 180 may sought to be upgraded (by performance of one or more queries) from one version to another, typically corresponding to upgrading of a corresponding enterprise application (using the data).

It may be appreciated that the enforcement of constraints while storing such large amounts of data may require substantial time/resources. Accordingly, the large amount of data may be stored in database server 180A without enforcing the constraints, thereby requiring the imported/migrated/upgraded (in general, new) data in database server 180A to be validated after storing.

Further, validation of the existing data in database server 180A may also be required to be performed, for example to ensure that the data used by various enterprise applications executing in server system 190 is consistent (without incorrect data values). Such validations of existing data (as well as the import, migrate, upgrade actions described above) may be performed in response to client requests (for example, from an administrator) received from one of client systems 110A-110C.

Different checks may be performed as part of validation of the new/existing data. For example, data values (contained in the new/existing data) may be checked to determine whether the data values are contained in a pre-specified set (look up validation) or a dynamic set (foreign key constraint validation), conform to pre-specified/user-specified business rules (field level validation), etc.

In particular, it may be desirable that the validation of foreign key constraints be performed, since foreign key constraints represent relationships between the data values maintained in database server 180A, and as such it may be necessary to check whether the new/existing data confirms to such pre-defined relationships.

In one prior approach, the validation of new/existing data (including foreign key constraints) is performed by an administrator from client systems 110A-110B or server system 190, wherein the administrator manually creates and executes SQL scripts designed to validate the data. In another prior approach, validation of new/existing data is performed by a vendor of an enterprise application using the new/existing data. The vendor is provided access to database 180A (storing the data to be validated), with the vendor performing the validation similar to the administrator (from vendor system 130).

Validation tool 150, provided according to several aspects of the present invention, validates data in a database system for foreign key constraints (such as 180A/180B) as described below with examples. Though shown internal to server system 190, validation tool 150 may be provided external to server system as an independent unit or as part of another system such as database servers/systems 180A-180B according to the specific requirements of the operating environment.

3. Offline Validation of Data For Foreign Key Constraints

Figure 2:
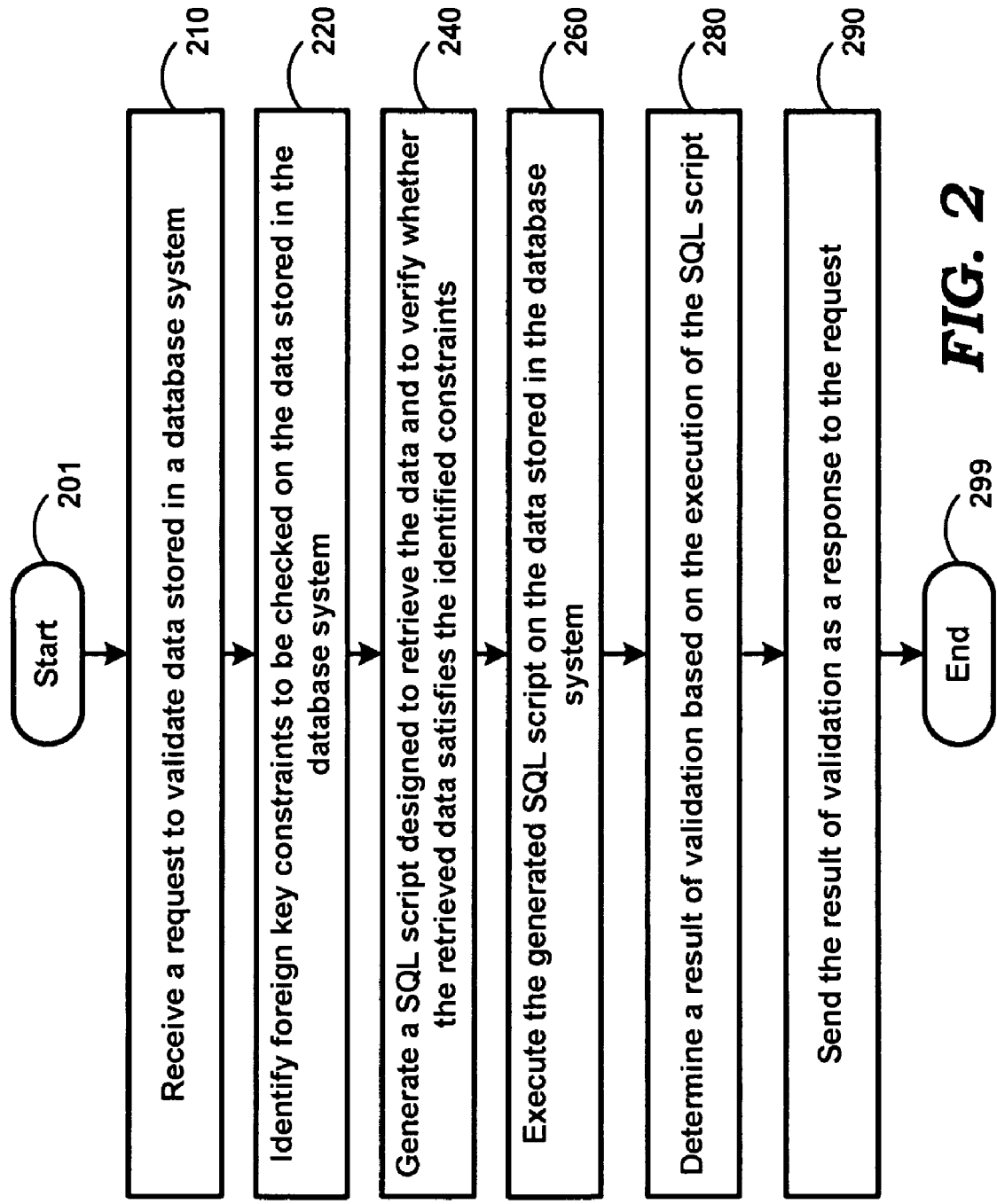
FIG. 2 is a flowchart illustrating the manner in which foreign key constraints in a database system are validated according to an aspect of the present invention.

FIG. 2 is a flowchart illustrating the manner in which offline validation of data in a database system for foreign key constraints is performed according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, validation tool 150 receives a request to validate data stored in a database system (such as 180A-180B). The request may be received from users/administrators using one of client systems 110A-110B or server system 190. The request may indicate the specific database server/system (e.g., by an appropriate URL or address) to validate and also the specific one or more of the databases/tables to be validated.

The request may also be received from an enterprise application (executing in server system 190) after performing one of import, migrate and upgrade actions in response to client requests. Alternatively, the request may be received to validate/test the existing data in database server 180A used by an enterprise application, for example, when an administrator/user identifies that the existing data is incorrect while performing tasks using the enterprise application. Thus, a request for offline validation is received for validating data already stored in the database system.

In step 220, validation tool 150 identifies foreign key constraints to be checked on the data stored in the database system (180A). The foreign key constraints specify a foreign key column in a first table (hereafter referred to as a "detail table") and a primary key column in a second table (hereafter referred to as a "master table"), thereby indicating that the data values stored in the foreign key column are restricted to the specific data values stored in the primary key column.

The data specifying the foreign key constraints is referred to as foreign key constraint data, which may be maintained in the form of meta-data. The meta-data may be maintained internal to the database system (180A) or may be maintained external to the database system (e.g. in the form of files) in server system 190. Accordingly, validation tool 150 retrieves (and identifies) the specific foreign key constraint meta-data related to the database system and/or the database/tables sought to be validated.

Thus, validation tool 150 identifies one or more foreign key constraints, with each of the constraints containing identifiers of a foreign key column, a detail table, a primary key column and a master table.

In step 240, validation tool 150 generates a SQL script (containing one or more queries, control statements, comments etc. in accordance with the SQL standard) designed to retrieve the data and to verify whether the retrieved data satisfies the identified constraints. In an embodiment, validation tool 150 first generates an SQL query corresponding to each identified foreign key constraint. The generated SQL query is designed to retrieve the data values from the foreign key column of the detail table and to check whether each retreived data value is contained in the data values retrieved from the primary key column of the master table.

Validation tool 150 may then include the generated SQL queries (according to an order specified by the meta-data) and control statements, etc., to form the SQL script. In general, the control satements operate to control the flow/execution of the SQL queries in addition to providing the necessary values formed by execution of one query to the other.

In step 260, validation tool 150 executes the generated SQL script on the data stored in the database system. The execution of a SQL script typically entails establishing a connection to the database system (180A) for which the validation request is received, sending the SQL script for execution, and receiving a response from the database system indicating the status (success or failure) of execution of the SQL script. The established connection may be disconnected or may be maintained for executing SQL scripts at a later time.

It may be appreciated that the response/output (received from the database system) may contain portions of the retrieved data (such as valid/invalid data values) based on the design of the SQL script. Further, the execution of the SQL script may cause comparison data (indicating the status of the execution, the valid/invalid values corresponding to each constraint, etc.) to be generated and stored in one or more tables in the database system (180A).

In step 280, validation tool 150 determines a result of validation based on the execution of the SQL script. The result of validation indicates whether the data in the database system satisfies the identified foreign key constraints or not (in other words, whether the data already stored in the database system is consistent with the design/definition of the database system). In the context of data migration, the result of validation may indicate the relationships (as defined by the foreign key constraints) or the specific data/rows of the table in the destination database system (180A, containing the migrated data) that do not match the relationships defined in the source database system (180B, containing the pre-migrated data).

The result of validation may merely indicate the success or failure of validation, and may be determined based on the status of execution of the SQL script. Alternatively, the result of validation may be determined by inspecting the output data received in response to the execution of the SQL script. The result may also be determined by retrieving (using appropriate queries) and inspecting the comparison data generated and stored by the execution of the SQL script.

The result of validation may contain data such as the foreign/primary key column names and corresponding data values (in the detail table) that are determined to be invalid by execution of the SQL script. In general, the result of validation contains data that enables users/administrators to identify the invalid data values (and to make necessary corrections) in the database system (180A) requested to be validated.

In step 290, validation tool 150 sends the result of validation as a response to the request (received in step 210). Results may be sent as a response to the client system from which the request for validation was received or to any other system/storage depending on information contained in the received request. Validation tool 150 may also include associated information in the response such as time of request/response, time to process/validate, etc. to facilitate users/administrators to evaluate the status of the database system. The flow chart ends in step 299.

Thus, validation tool 150 by performing the steps of identification of the foreign key constraints and the generation and execution of a corresponding SQL script ensures that the data in the database system is validated for the foreign key constraints. The validated data may be used by applications executing in server system 190 while processing client requests.

While the steps above are described as being performed by validation tool 150 provided within server system 190, in an alternative embodiment of the present invention, steps 220 and 240 are performed by vendor system 130, with validation tool 150 designed to send a request (indicating the specific database systems/databases/tables) to vendor system 130. In response, vendor system 130 identifies the foreign key constraints based on the meta-data maintained by vendor system 130 (or received along with the request from validation tool 150) and generates a SQL script for validating the specific database system/databases/tables as indicated in the request. Vendor system 130 then sends the generated SQL script as a response to validation tool 150.

Such a feature is particularly useful when vendors (e.g., Oracle Systems, the intended assignee of the subject patent application, SAP Corporation, Microsoft, etc.) have agreements with customers to provide maintenance support, and the vendors therefore design and maintain information related to the organization of the tables, etc., within the database 180A/180B. Thus, to service the customers, the vendors may conveniently provide the features described in the present specification/drawings.

Further, the validation of the data may indicate the status of performance of migration, upgrade, import, etc., wherein a large amount of data is stored without enforcing constraints. For example, an invalid result may indicate that at least some of the steps in the migration, upgrade, and import of large amount of data need to be performed again or more specific corrective measures such editing/removal of specific rows/data is to be performed.

The description is continued illustrating the manner in which validation tool 150 provides offline validation of data in a database system for foreign key constraints in one embodiment.

4. Example Implementation

FIGS. 3, 4A-4D, 5A-5B and 6A-6B together illustrate the manner in which foreign key constraints are validated in a database system in one embodiment. The description is continued assuming that the foreign key constraints are sought to be validated in database server 180A, though the below description is applicable to any other database system without such a feature. Each of the Figures is described in detail below.

Figure 3:
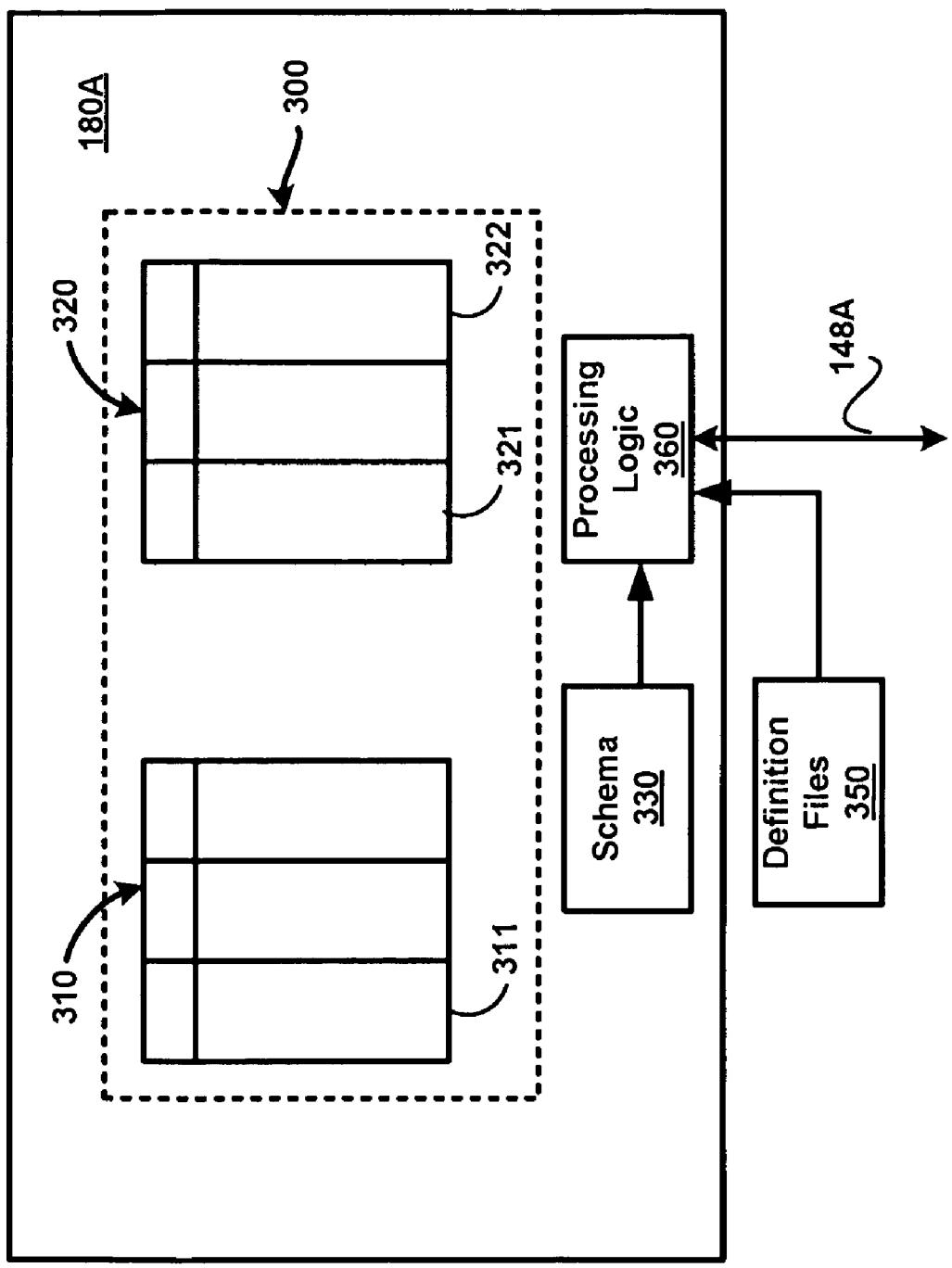
FIG. 3 is a block diagram illustrating the manner in which constraints are maintained and enforced in database server in one embodiment.

FIG. 3 is a block diagram illustrating the manner in which constraints are maintained and enforced in database server 180A in one embodiment. For conciseness, only the blocks relevant to understanding the present invention are included in the FIG. 3. However other blocks of various types/functions may also be present within the database system. Each of the blocks of FIG. 3 is described in detail below.

Database server 180A is shown containing database 300, which may store data used by an enterprise application in server system 190. It should be appreciated that a single database server may support multiple databases, each with its corresponding organization (typically defined by a database schema). Accordingly, the structure of database 300 and also the constraints on the data values stored in database 300 may be defined and delivered by a vendor of the enterprise application.

Database 300 is shown containing master table 310 having primary key column 311 and detail table 320 having primary key column 321 and foreign key column 322. As is well known, data values stored in primary key columns 311 and 321 uniquely identify each row of the corresponding tables 310 and 320.

A foreign key constraint between tables 310 and 320 may be defined, indicating that the data values stored in foreign key column 322 of detail table 320 are required to be one of the data values present in primary key column 311 of master table 310. Accordingly, a data value in foreign key column 322 is considered invalid if the data value is not present in the data values stored in primary key column 311.

Schema 330 contains information related to the databases (such as database 300) defined in database server 180A. In general, schema 330 contains information such as the identifier of each of the tables, the identifier/data type of each of the columns in each of the tables, the constraints to be enforced on the data values stored in each of the columns, etc.

Thus, schema 330 contains data indicating that columns 311 and 321 are primary key columns for the corresponding tables 310 and 320 and that column 322 (in detail table 320) is a foreign key column that is related to primary key column 311 (in master table 310). In one embodiment, schema 330 is implemented as one or more system tables that are maintained by processing logic 360.

Processing logic 360 processes the requests (containing scripts, queries, commands, etc.) received (via path 148A) from applications executing in server system 190. The request may contain commands (e.g. CREATE, ALTER, DROP in case of SQL) for defining new structures/constraints in database server 180A, modifying/removing the existing structures/constraints, etc. Accordingly, processing logic 360 may modify the structures/constraints in database server 180A (including database 300) and also the data stored in schema 330 (to reflect the modifications).

Alternatively, the requests may contain queries (e.g. INSERT, UPDATE, SELECT, DELETE in case of SQL) for storage (of new/updated) data values, retrieval of data values, removal of data values from one or more columns (such as 311,321, 322, etc.) in database server 180A. On receiving such queries, processing logic 360 performs the requested actions on the data values maintained in database server 180A and sends the results of performance of the actions as corresponding responses to server system 190 (via path 148A).

Processing logic 360 is further designed to enforce the constraints (defined in schema 330) during the performance of the requested actions, in particular, when adding/modifying/deleting (storing) data in database server 180A. For example, processing logic 360 stores a new/updated data value in column 322 of database 300 only after ensuring that the new/updated data value exists in column 311 (due to the foreign key constraint defined between columns 322 and 311 in schema 330). Further, processing logic 360 ensures that a data value in column 311 is deleted only if the data value does not exist in column 322.

The foreign key constraints may be determined either based on examination of schema 330 or by parsing/retrieving the same information provided from an external file (shown as definition file 350). Definition file 350 may be generated manually (e.g., by a vendor) while designing the various tables of a database.

The enforcement of the constraints by processing logic 360 can be controlled by including appropriate commands in the requests. For example, a "SET CONSTRAINTS ON" command causes processing logic 360 to enforce the constraints defined in schema 330, while a "SET CONSTRAINTS OFF" command causes processing logic 360 to store data without enforcing the constraints.

In general, constraints are always checked in a database system (during normal operation, that is, during the performance of the requested actions), unless checking is explicitly switched off by issuing appropriate commands (for example, when importing, updating, and migrating large amounts of data). Such switching off may be performed when porting/migrating external data, as briefly noted above. It may then be necessitated that the data populated in the database system be validated for foreign key constraints offline.

Definition files 350 represent one or more files which together specify the structure/constraints of databases (including database 300) defined in database server 180A. Accordingly, definition files 350 may contain data indicating that columns 311 and 321 are primary key columns for the corresponding tables 310 and 320, and that column 322 (in detail table 320) is a foreign key column that is related to primary key column 311 (in master table 310).

The description is continued assuming that the data in definition files 350 is specified according to extended markup language (XML) format. However, other types of formats (such as XDF, sXML, etc.) can be used to represent the data in definitions files. Definition files 350 may contain data similar to schema 330 maintained in database server 180A.

It may be appreciated that some of definition files 350 and/or portions of schema 330 defining the structure and/or constraints of database 300 may be provided by the vendor of the enterprise application designed to use database 300. The vendor may also maintain a copy of the definition files and/or schema locally in vendor system 130 (or in an associated data store, not shown in FIG. 1).

The manner in which the structure/constraints of a database are defined in definition files is described below with examples.

5. Sample Definition Files

In one embodiment, the details (such as structure/constraints) of database 300 is defined in the form of multiple definition files (encoded in XML format), with each definition file specifying the details of a corresponding table in database 300. Accordingly, a first definition file (portions of which are shown in FIG. 4A) specifies the details of master table 310 and a second definition file (portions of which are shown in FIGS. 4B and 4C) specifies the details of detail table 320. Each of the definition files is described in detail below.

FIG. 4A depicts portions of a definition file specifying the details of master table 310 in database 300 in one embodiment. Only the relevant portions of the definition file are shown in FIG. 4A-4C for conciseness, though a definition file generally contains other portions as well specifying the other details of the corresponding master/detail table.

Further, a start tag "<composite>" (in line 400) and a corresponding end tag "</composite>" (in line 429) together is viewed as forming an element with name "composite", with the data contained between the tags representing the value corresponding to the element. The element may also have associated attributes (such as "version" in line 400) with corresponding values (such as "1.0"). Thus, lines 400-429 represents the element "composite" containing the element "base_object" as indicated by lines 400A-427.

Referring to FIG. 4A, element "table" in lines 401-426 specifies the details of master table 310 in database 300. The table is indicated as being part of schema "fusion" (element "schema" in line 402) and having the unique name "hrt_content_group_types_b" (element "name" in line 403).

Element "col_list" in lines 405-414 specify the details of the columns contained in master table 310 such as the column named "content_group_type_id" (element "col_list_item" in lines 406-412). Element "primary_key_constraint_list_item" in lines 415-423 specifies the columns that form the primary key (which uniquely identifies each row in master table 310). The primary key is indicated to contain the column "content_group_type_id" (element "name" in 419). It may be noted that column "content_group_type_id" corresponds to primary key column 311 in FIG. 3.

FIGS. 4B and 4C together depicts portions of a definition file specifying the details of detail table 320 (element "table" in lines 431-482) in database 300 in one embodiment. The table is indicated as being part of schema "fusion" (element "schema" in line 432) and having the unique name "hrt_content_groups_b" (element "name" in line 433).

Element "col_list" in lines 435-451 specify the details of the columns contained in detail table 310 such as columns named "content_group_id", "content_group_type_id" (element "col_list_item" in respective lines 436-442 and 443-449). Element "primary_key_constraint_list_item" in lines 452-459 specifies the columns that form the primary key (which uniquely identifies each row in detail table 320). The primary key is indicated to contain the column "content_group_id" (element "name" in 456).

Element "foreign_key_constraint_list" in lines 461-479 specifies the details of the foreign key constraints specified for detail table 320. In particular, element "foreign_key_constraint_list_item" in lines 462-478 specifies the details of a single foreign key constraint such as the foreign key column in the detail table "content_group_type_id" (element "name" in line 466), the master table "hrt_content_grp_types_b" (element "name" in line 471), and the primary column in the master table "content_group_type_id" (element "name" in line 474).

It may be noted that columns "content_group_id" and "content_group_type_id" corresponds respectively to primary key column 321 and foreign key column 322 in FIG. 3. Further, a foreign key constraint is defined between tables 310 and 320, indicating that the data values stored in foreign key column 322 of detail table 320 are required to be one of the data values present in primary key column 311 of master table 310.

Thus, the definition files described above provides the details of foreign key constraints between two tables in database 300. Similarly, other definition files may specify the details of foreign key constraints related to other tables in database 300. The set of definition files corresponding to database 300 may be used by validation tool 150 to identify the foreign key constraints as described below with examples.

5. Identifying Foreign Key Constraints

Validation tool 150 receives a request (from client system 110A) for validating foreign key constraints in database server 180A. The request may be received after migration of data from another database server 180B to database server 180A. The description is continued assuming that the request indicates that the data in database 300 is sought to be validated. However, the request may also indicate the one or more tables (and databases) maintained in database server 180A whose data is sought to be validated.

In response to receiving the request, validation tool 150 first identifies foreign key constraints to be checked on the data stored in database 300, for example, by inspecting the set of definition files specifying the details of database 300.

Accordingly, validation tool 150 may inspect the portions of definition files shown in FIGS. 4A-4C and identify the foreign key constraint specified between the foreign key column "content_group_type_id" (line 466 in FIG. 4C) in the detail table "hrt_content_groups_b" (line 433 in FIG. 4B) and the primary key column "content_group_type_id" (line 474 in FIG. 4C and line 419 of FIG. 4A) in the master table "hrt_content_grp_types_b" (line 471 and FIG. 4C and line 403 in FIG. 4A).

Similarly, validation tool 150 identifies the other foreign key constraints by inspecting the other definition files corresponding to database 300. In a scenario that the request indicates specific tables in database 300, validation tool 150 may inspect only the required definition files to identify the foreign key constraints.

In one embodiment, validation tool 150 determines the information related to a foreign key constraint from only the definition file corresponding to the detail table (FIGS. 4B-4C). However, in an alternative embodiment, the definition file corresponding to the master table (FIG. 4A) may also be used in determining the information, for example, to verify the names of the master table/primary key column determined from definition file corresponding to the detail table.

Accordingly, a parser (for example an XML parser) is used to parse the definition file corresponding to the detail table and to construct a corresponding tree structure termed document object model (DOM) in memory. The tree structure is then traversed using function calls provided by DOM to determine the nodes corresponding to the elements "table", "foreign_key_constraint_list", etc. The text/information associated with the determined nodes (indicating the names of the master/detail table, primary/foreign key columns, etc.) is then retrieved for identifying the foreign key constraints.

It should be noted that parsing of definition files (construction of the DOM) in general requires considerable resources (e.g. memory space) and/or time. As such, validation tool 150, according to an aspect of the present invention, preprocesses the set of definition files corresponding to database 300 and determines the foreign key constraints defined for database 300 as described below with examples.

FIG. 4D depicts a portion of a properties file storing the foreign key constraints defined for database 300 in one embodiment. The properties file is generated by parsing the definition files (using a parser as described above) and then storing the text/information retrieved from the DOM in a pre-defined format.

According to the pre-defined format, each line in the properties file specifies the details of a foreign key constraint as the detail table name followed by the first ".", foreign key column name followed by a "=", master table name followed by the second "." and the primary key column name.

Thus, line 495 (generated from the portions of the definition files shown in FIGS. 4A-4C) indicates a foreign key constraint between the detail table "hrt_content_groups_b", foreign key column "content_group_type_id" and the master table "hrt_content_grp_types_b", primary key column "content_group_type_id". Line 496 specifies the details of another foreign key constraint determined and stored by validation tool 150 by inspecting other definition files (not shown) corresponding to database 300. Similarly, other foreign key constraints may be determined and stored in the properties file.

In response to a request to validate data stored in database 300, validation tool 150 identifies all the lines/constraints maintained in the properties files. In a scenario that the request indicates specific tables in database 300, validation tool 150 may identify only the lines/foreign key constraints relevant to the specific tables.

Thus, validation tool 150 identifies the foreign key constraints (assumed to be the constraints indicated by lines 495 and 496) that are to be checked on the data stored in database 300. Validation tool 150 then generates and executes a SQL script designed to retrieve the data (in database 300) and to verify whether the retrieved data satisfies the identified constraints as described below with examples.

6. Generating and Executing SQL script

FIG. 5A depicts a portion of a SQL script generated to check foreign key constraints for database 300 in database server 180A in one embodiment. Lines 500 and 521 are comments that respectively indicate the beginning and end of the SQL script and may be added by the validation tool 150 while generating the SQL script.

Lines 501-520 specify SQL queries generated corresponding to the foreign key constraints shown in FIG. 4C. In particular, lines 501-510 specify the SQL query generated corresponding to the foreign key constraint in line 495 and lines 511-520 specify another SQL query generated corresponding to the foreign key constraint in line 496.

It may be observed that the SQL queries are designed to retrieve the data values in the foreign key columns "content_group_type_id" (line 506) and "content_type_id" (line 516) from detail tables ""hrt_content_groups_b" (line 505) and "hrt_content_items_b" (line 515) and to check whether the retrieved values are not contained in (as indicated by the "not in" operator in lines 507 and 517) the data values retrieved from the primary key columns "content_group_type_d" (line 508) and "content_type_id" (line 518) from the master tables "hrt_content_grp_types_b" (line 509) and "hrt_content_types_b" (line 519). It may be noted that only the non-null data values in the foreign key columns are retrieved and checked, as indicated by the condition "is not NULL" in lines 510 and 521.

Lines 501-504 and 511-514 respectively generate the output based on the checks performed during execution. Each query is designed to generate a output containing the invalid data values in the foreign key column of the detail table that are not present in the data values stored in the primary key column of the masters table. The query is further designed to generate no output if all the data values in the foreign key column of the detail table are determined to be present in the primary key column of the master table.

Validation tool 150 thus generates a SQL script designed to verify whether the data stored in database server 180A satisfies the identified foreign key constraints (shown in FIG. 4D). Validation tool 150 may further store the generated SQL script in a secondary storage (not shown), for example, in the form of a (text) file.

It may be appreciated that validation tool 150 may generate the SQL script using any desired programming logic and in any desired format, for example, in the form of stored procedures, as a complex query using joins, etc. in conformance to the SQL standard (or possible extensions such as PL/SQL), as will be apparent to one skilled in the relevant arts.

In one embodiment, a query template is defined containing SQL keywords (e.g. "SELECT", "FROM"), syntax elements (e.g. "||", ","), fixed text (e.g. "table name:", "column:"), place holders for information related to foreign key constraints, etc. The SQL queries corresponding to the identified foreign key constraints are then generated by retrieving information (such as the names of the master/detail tables, primary/foreign key columns) for each foreign key constraint from the properties file (FIG. 4D) and then substituting the retrieved information for the corresponding place holders in the query template. The generated SQL queries are then concatenated with comments (pre-defined text) to generate the SQL script.

According to an aspect of the present invention, the steps of identification of the foreign key constraints and the generation of the SQL script are performed by vendor system 130, with validation tool 150 designed to retrieve the generated SQL script from vendor system 130. Vendor system 130 identifies and generates the SQL script based on meta-data maintained locally (in a data store associated with vendor system 130) or received from validation tool 150. Vendor system 130 may also be designed to perform the pre-processing of the meta-data (to generate the data shown in FIG. 4D) as described above with respect to validation tool 150.

In one embodiment, validation tool 150 sends a request to vendor system 130 containing the set of definition files (including the portions shown in FIGS. 4A-4C) corresponding to the database system storing the data sought to be validated. Validation tool 150 then receives the generated SQL script (shown in FIG. 5A) from vendor system 130 as a response to the request. Validation tool 150 then executes the generated SQL script as described below with examples.

FIG. 5B depicts a portion of output of execution of a SQL script (shown in FIG. 5A) designed to check foreign key constraints for database 300 in database server 180A in one embodiment. Lines 550 and 555 are comments that respectively indicate the beginning and end of the output and may be added by the validation tool 150 while executing the SQL script.

Lines 551-554 represents the output generated on execution of the query shown in lines 501-510, indicating that that there are data values in foreign key column "content_group_type_id" in the detail table "hrt_content_groups_b" that are not present in the data values stored in the primary key column "content_group_type_id" in the master table "hrt_content_grp_types". Each of lines 551-554 indicates a corresponding row identified by the primary key (321) data values 205, 209, 204 and 207 that have a foreign key column (322) data value "104" not contained in the data values of the primary key column (311) of the master table.

It may be noted that FIG. 5B does not contain the output of execution of the query shown in lines 511-520 indicating that all the data values in the foreign key column "content_type_id" in the detail table "hrt_content_items_b" are present in the data values of the primary key column "content_type_id" in the master table "hrt_content_types" (line 518-519).

It may be appreciated that though the output is shown as indicating the name, and the names/values of the primary key/foreign key columns in the details tables, the SQL script may be designed to include any other desired information (such as the name of the schema, the data values stored in other columns, etc) in the output. In general, the output contains information facilitating users/administrators to determine and correct the specific data values not satisfying the foreign key constraints.

Thus, validation tool 150 executes the SQL script shown in FIG. 5A to generate the output shown in FIG. 5B. Validation tool 150 may store the output in a secondary storage (not shown), in the form of a (text) file.

Validation tool 150 then determines a result of validation (of database 300) based on the status and output of execution of the SQL script. For example, in a scenario that the SQL script is successfully executed, validation tool 150 may check whether the name of the detail table corresponding to each identified foreign key constraint is contained in the output of execution (shown in FIG. 5B). Validation tool 150 thens sets the result of validation as success if the detail table name is not contained in the output and as failure otherwise for each of the identified constraints. Validation tool 150 then sends the result of validation as a response to the request to the requesting client system 110A-110C or to server system 190.

In one embodiment, validation tool 150 determines the result of validation to be the same as the output of execution. Accordingly, the output of execution of the SQL script (shown in FIG. 5B) is sent as the result of validation of database 300 in database server 180A to the requesting system (such as client system 110A-110C). The result/output of validation is then displayed on a display unit associated with the requesting system, to facilitate the users/administrators to correct the invalid data values or to perform again some of the steps in the migration, upgrade, and import (done prior to validation).

Thus, validation tool 150 validates offline the data in database 300 (contained in database server 180A) for foreign key constraints. The validation of data in other database systems (e.g. database server 180B) for foreign key constraints may be similarly performed.

It should be further appreciated that the features of validation tool 150 described above can be implemented in various embodiments as a desired combination of one or more of hardware, software, and firmware. The description is continued with respect to an embodiment in which various features are operative when the software instructions are executed.

6. Digital Processing System

Figure 6:
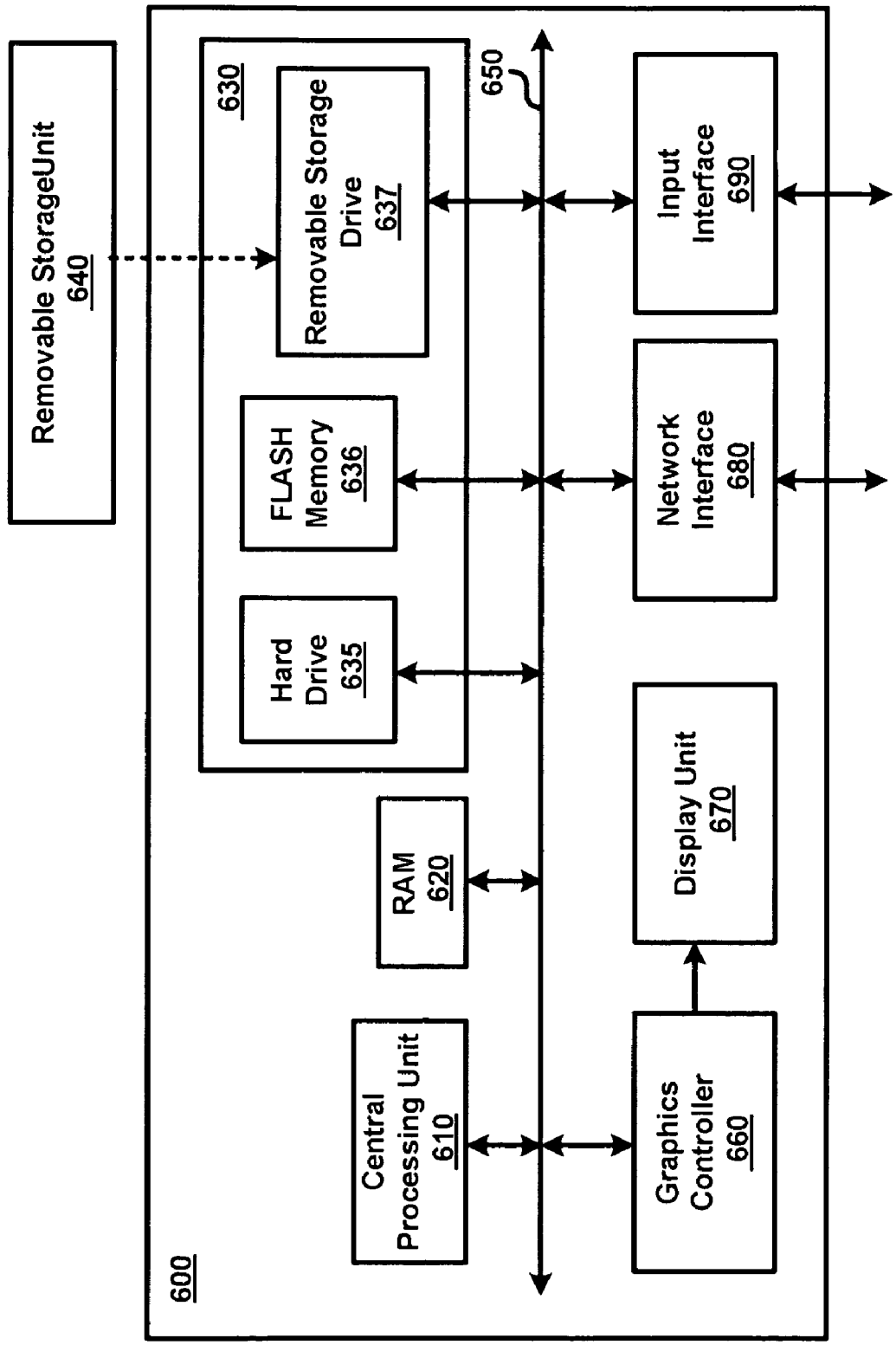
FIG. 6 is a block diagram illustrating the details of digital processing system in which various aspects of the present invention are operative.

FIG. 6 is a block diagram illustrating the details of digital processing system 600 in which various aspects of the present invention are operative by execution of appropriate software instructions. Digital processing system 600 may correspond server system 190 (or any other system executing validation tool 150) or vendor system 130.

Digital processing system 600 may contain one or more processors (such as a central processing unit (CPU) 610), random access memory (RAM) 620, secondary memory 630, graphics controller 650, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse). Network interface 680 provides connectivity to a network (e.g., using Internet Protocol), and may be used to communicate with other connected systems (such as client systems 110A-110C) of FIG. 1.

Secondary memory 630 may contain hard drive 635, flash memory 636, and removable storage drive 637. Secondary memory 630 may store the data (e.g., portions of FIGS. 4A-4C and 5A-5B) and software instructions, which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

13. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A non-transitory machine readable medium storing one or more sequences of instructions for causing a digital processing system to validate foreign key constraints on data stored in a database system, wherein execution of said one or more sequences of instructions by one or more processors contained in said system causes said system to perform the actions of:

populating data in a database of said database system without enforcement of foreign key constraints defined for said database;

identifying a foreign key constraint defined for said database, wherein said foreign key constraint comprises a foreign key column in a detail table and a primary key column in a master table, wherein said digital processing system examines data representing a schema of said database and generates an output indicating that said foreign key column and said primary key column comprises said foreign key constraint;

generating, based on said output generated by said identifying, a script designed to retrieve and verify whether the data values stored in said foreign key column of said detail table are present in said primary key column of said master table; and executing said script on said database system to determine whether data stored in said database satisfies said foreign key constraint, wherein execution of said script causes retrieval of data values stored in both of said detail table and said master table, wherein said script is executed offline after completion of said populating.

2. The non-transitory machine readable medium of claim 1, wherein said script comprises an structured query language (SQL) query to retrieve data values in said foreign key column and to check whether each of the retrieved data values is present in said primary key column of said master table.

3. The non-transitory machine readable medium of claim 2, wherein said SQL query, on execution, is designed to retrieve and return as a result only the data values in said foreign key column that are determined to be not present in said primary key column, wherein absence of data values in said result indicates that data stored in said database system satisfies said foreign key constraint.

4. The non-transitory machine readable medium of claim 3, wherein said result further contains values of another column of said detail table corresponding to each of the determined data values, wherein the values of said another column identify the specific rows in said detail table that do not satisfy said foreign key constraint.

5. The non-transitory machine readable medium of claim 3, wherein said SQL query is:

select distinct
   'table name: DETAIL_TABLE' ||',
   ANOTHER_COLUMN:'
     ||ANOTHER_COLUMN_VALUE||',
   column: FOREIGN_KEY, value: '|| FOREIGN_KEY_VALUE
from DETAIL_TABLE
where FOREIGN_KEY not in
   (select MASTER_PRIMARY_KEY from MASTER_TABLE)
and FOREIGN_KEY_VALUE is not null wherein DETAIL_TABLE represents the name of said detail table, ANOTHER_COLUMN and ANOTHER_COLUMN_VALUE respectively represent the name and a data value of said another column of said detail table, FOREIGN_KEY and FOREIGN_KEY_VALUE respectively represents the name and a data value of said foreign key column in said detailed table, MASTER_PRIMARY_KEY represents the name of said primary key column and MASTER_TABLE represents the name of said master table.

6. The non-transitory machine readable medium of claim 3, further comprising one or more instructions for:
receiving a request from a client system on a network to validate the data in said database system, wherein said request is received after said populating,
wherein said identifying, said generating and said executing are performed in response to said request, and
sending a response to said request, wherein said response contains said result.

7. The non-transitory machine readable medium of claim 2, further comprising one or more instructions for:
retrieving from a file a set of foreign key constraints for said detail table, wherein said foreign key constraint is contained in said set of foreign key constraints;
enforcing said set of foreign key constraints while processing SQL queries directed to said database system,
wherein said identifying is performed by retrieving said foreign key constraint from said file.

8. The non-transitory machine readable medium of claim 7, wherein said file is a definition file according to an XML (extended markup language) format storing said set of constraints in the form of a metadata.

9. A method of validating foreign key constraints in a database system, said method comprising:
populating data in said database system, wherein said populating causes said data to be stored in a plurality of tables of said database system;
receiving, from a user, a request to validate offline said data in said database system, wherein said request is received after said data is stored in said database system;
identifying a foreign key constraint to be checked on the data stored in said database system by said populating, wherein said foreign key constraint comprises a primary key column in a first table and an associated foreign key column in a second table, said first table and said second table being comprised in said plurality of tables;
generating a SQL (structured query language) script designed to retrieve said data stored in said foreign key column and to verify whether the retrieved data is also present in said primary key column to satisfy said foreign key constraint; and
executing said SQL script on said database system to retrieve and determine whether data stored in said database system satisfies said foreign key constraint,
wherein said identifying, said generating and said executing are performed in response to receiving said request from said user to validate said data stored in said database system.

10. The method of claim 9, wherein said populating comprises:
disabling checking of said foreign key constraint in said database system; and
storing said data in said database system without enforcing said foreign key constraint.

11. The method of claim 10, wherein said populating is performed during one of migration, import and upgrade operations on said database system.

12. The method of claim 10, further comprising:
determining a result of validation based on said executing, wherein said result of validation indicates whether data in said database system satisfies said foreign key constraint; and
sending said result of validation as a response to said request.

13. The method of claim 12, further comprising:
storing a metadata related to each of said plurality of tables in a corresponding one of a plurality of definition files;
pre-processing said plurality of definition files to identify a plurality of sets of foreign key constraints, wherein each set of foreign key constraints corresponds to one of said plurality of tables; and
storing said plurality of sets of foreign key constraints in a second file,
wherein said identifying is performed by examining said second file in response to said request.

14. The method of claim 9, wherein said SQL query, on execution, is designed to return as a result only the data values in said foreign key column that are determined to be not present in said primary key column,
wherein absence of data values in said result indicates that data stored in said database system satisfies said foreign key constraint.

15. A computing system comprising:
a database system, provided by a vendor, to store data in the form of a plurality of tables defined according to a database schema, said database schema specifying a foreign key constraint comprising a foreign key column in a detail table and a primary key column in a master table, said detail table and said master table being contained in said plurality of tables;
a vendor system, operated by said vendor, to generate a script designed to cause retrieval of data stored in said database system and to verify said foreign key constraint in response to receiving a request; and
a validation tool operable to:
send said request to said vendor system indicating that data in said database system is to be validated for foreign key constraints;
receive said script from said vendor system in response to sending of said request;
execute said script to cause retrieval of said data and to check whether the data values stored in said foreign key column of said detail table are present in said primary key column of said master table; and
determine whether data stored in said database system satisfies said foreign key constraint based on a result of execution of said script,
wherein said database system and said validation tool are deployed at a customer site for storing data, and said vendor system is at a vendor site external to said customer site.

16. The computing system of claim 15, further comprising:
another database system; and
a server system to execute an application designed to migrate the data from said another database system to said database system without checking for foreign key constraints,
wherein said validation tool identifies said foreign key constraints, causes said vendor system to generate said script and executes said script in response to receiving a request from said application after migrating the data.

17. The computing system of claim 15, wherein said validation tool sends a metadata as part of said request to said vendor system, said metadata indicating that said foreign key constraint is related to data stored in said database system,
wherein said vendor system identifies said foreign key constraint based on said metadata and generates said script after said identifying.

18. The computing system of claim 15, wherein said vendor system maintains a metadata indicating that said foreign key constraint is related to data stored in said database system, wherein said vendor system identifies said foreign key constraint based on said metadata and generates said script after said identifying, in response to receiving said request.

* * * * *

UNITED STATES PATENT AND TRADEMARK OFFICE
CERTIFICATE OF CORRECTION

| | | |
|---|---|---|
| PATENT NO. | : 8,065,323 B2 | Page 1 of 1 |
| APPLICATION NO. | : 12/391246 | |
| DATED | : November 22, 2011 | |
| INVENTOR(S) | : Sallakonda et al. | |

It is certified that error appears in the above-identified patent and that said Letters Patent is hereby corrected as shown below:

In column 6, line 5, delete "retreived" and insert -- retrieved --, therefor.

In column 6, line 10, delete "satements" and insert -- statements --, therefor.

In column 8, line 6, delete "321and" and insert -- 321 and --, therefor.

In column 12, line 31, delete "type_d"" and insert -- type_id" --, therefor.

In column 13, line 67, delete "thens" and insert -- then --, therefor.

Signed and Sealed this
Seventh Day of February, 2012

David J. Kappos
*Director of the United States Patent and Trademark Office*